United States Patent
Sudol et al.

(10) Patent No.: US 10,997,790 B2
(45) Date of Patent: *May 4, 2021

(54) MARKER-BASED AUGMENTED REALITY AUTHORING TOOLS

(71) Applicant: NANT HOLDINGS IP, LLC, Culver City, CA (US)

(72) Inventors: Jeremi M Sudol, New York, NY (US); John Wiacek, Culver City, CA (US)

(73) Assignee: NANT HOLDINGS IP, LLC, Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/579,685

(22) Filed: Sep. 23, 2019

(65) Prior Publication Data

US 2020/0035033 A1 Jan. 30, 2020

Related U.S. Application Data

(63) Continuation of application No. 15/846,041, filed on Dec. 18, 2017, now Pat. No. 10,424,123, which is a continuation of application No. 14/851,897, filed on Sep. 11, 2015, now Pat. No. 9,892,560.

(60) Provisional application No. 62/049,351, filed on Sep. 11, 2014.

(51) Int. Cl.
G06T 19/00 (2011.01)

(52) U.S. Cl.
CPC .... G06T 19/006 (2013.01); *G06T 2219/2004* (2013.01)

(58) Field of Classification Search
CPC ................................. G06T 19/006
USPC ........................................... 345/633
See application file for complete search history.

(56) References Cited

U.S. PATENT DOCUMENTS

| | | | |
|---|---|---|---|
| 6,711,293 B1 | 3/2004 | Lowe | |
| 7,016,532 B2 | 3/2006 | Boncyk et al. | |
| 7,068,290 B2 * | 6/2006 | Bennett | G06F 16/29 |
| | | | 345/633 |

(Continued)

FOREIGN PATENT DOCUMENTS

| | | |
|---|---|---|
| EP | 2490182 | 8/2012 |
| WO | 2009085225 | 7/2009 |

(Continued)

OTHER PUBLICATIONS

Wilson, Mark, "This Crazy App Turns A Magazine Into An Interior Design Tool," Jan. 3, 2014, downloaded at http://www.fastcodesign.com/3024113/this-crazy-app-makes-a-magazine-an-interior-design-tool.

(Continued)

*Primary Examiner* — Javid A Amini
(74) *Attorney, Agent, or Firm* — Stetina Brunda Garred and Brucker

(57) ABSTRACT

An augmented reality-based content authoring tool is presented. A content author arranges machine-recognizable markers in a physical environment. A computing device operating as the authoring tool recognizes the markers and their arrangement based on a captured digital representation of the physical environment. Once recognized, augmented reality primitives corresponding to the markers can be bound together via their primitive interfaces to give rise to a content set. The individual primitives and content set are instantiated based on the nature of the marker's arrangement.

29 Claims, 4 Drawing Sheets

(56) References Cited

U.S. PATENT DOCUMENTS

| | | | |
|---|---|---|---|
| 7,639,387 B2 * | 12/2009 | Hull | G06K 9/00442 358/1.18 |
| 8,218,873 B2 | 7/2012 | Boncyk et al. | |
| 8,224,077 B2 | 7/2012 | Boncyk et al. | |
| 8,224,078 B2 | 7/2012 | Boncyk et al. | |
| 8,682,879 B2 | 3/2014 | Kim et al. | |
| 8,712,193 B2 | 4/2014 | Boncyk et al. | |
| 8,718,410 B2 | 5/2014 | Boncyk et al. | |
| 9,892,560 B2 * | 2/2018 | Sudol | G06T 19/006 |
| 10,424,123 B2 * | 9/2019 | Sudol | G06T 19/006 |
| 2010/0164990 A1 | 7/2010 | Van Doorn | |
| 2011/0029398 A1 | 2/2011 | Boudville | |
| 2011/0154174 A1 * | 6/2011 | Liu | G06K 19/06103 715/205 |
| 2011/0258175 A1 * | 10/2011 | Kim | G09G 5/377 707/709 |
| 2011/0310260 A1 | 12/2011 | Jordan et al. | |
| 2012/0163672 A1 | 6/2012 | McKinnon | |
| 2013/0281206 A1 * | 10/2013 | Lyons | G07F 17/3211 463/33 |
| 2014/0111544 A1 | 4/2014 | Hammond | |
| 2014/0160158 A1 | 6/2014 | Allen | |

FOREIGN PATENT DOCUMENTS

| | | |
|---|---|---|
| WO | 2012160055 | 11/2012 |
| WO | 2014031899 | 2/2014 |
| WO | 2014048497 | 4/2014 |

OTHER PUBLICATIONS

Berry, et al., "The Augmented Composer Project: The Music Table," Proceedings of the Second IEEE and ACM International Symposium on Mixed and Augmented Reality. ISMAR 2003.

Silvio R.R. Sanches; Daniel M. Tokunaga; Valdinei F. Silva; Antonio Sementille; Romero Tori, "Mutual occlusion between real and virtual elements in Augmented Reality based on fiducial markers," 2012 IEEE Workshop on the Applications of Computer Vision (WACV) Year: 2012.

R. Berry; M. Makino; N. Hikawa; M. Suzuki, "The augmented composer project: the music table," The Second IEEE and ACM International Symposium on Mixed and Augmented Reality, 2003.

Kurz, Daniel et al., "Mutual Occlusions on Table-top Displays in Mixed Reality Applications," ACM, 2008.

* cited by examiner

US 10,997,790 B2

MARKER-BASED AUGMENTED REALITY AUTHORING TOOLS

CROSS-REFERENCE TO RELATED APPLICATIONS

This application is a continuation of U.S. application Ser. No. 15/846,041, filed Dec. 18, 2017, now U.S. Pat. No. 10,424,123 issued Sep. 24, 2019, which is a continuation of U.S. application Ser. No. 14/851,897, filed Sep. 11, 2015, now U.S. Pat. No. 9,892,560 issued Feb. 13, 2018 which relates to and claims the benefit of U.S. Provisional Application No. 62/049,351 filed Sep. 11, 2014 and entitled "MARKER-BASED AUGMENTED REALITY AUTHORING TOOLS", the entire disclosures of which are hereby wholly incorporated by reference.

STATEMENT RE: FEDERALLY SPONSORED RESEARCH/DEVELOPMENT

Not Applicable

BACKGROUND

Technical Field: The technical field of the present disclosure is augmented reality content development technologies.

The background description includes information that may be useful in understanding the present inventive subject matter. It is not an admission that any of the information provided herein is prior art or relevant to the presently claimed invention, or that any publication specifically or implicitly referenced is prior art.

Consumers have access to a broad spectrum of augmented reality (AR) experiences via their personal electronic devices. Consider the app Wikitude®. Wikitude provides information about landmarks by superimposing informational content about a landmark on a cell phone display. As a user points the camera of their cell phone toward a landmark, the cell phone identifies the landmarks in the field of view based on the cell phone's geo-location. In response to the viewing direction and location information, Wikitude returns informational pop-ups that can be superimposed on images of the landmarks.

Another example of an AR experience includes an interior design tool offered by IKEA® and developed by Adornably™. A user places an IKEA catalog on a floor with the catalog opened to a page having an image of a furniture piece of interest. The user then uses their cell phone, enabled with the Adornably app, to capture an image of the room, floor, and catalog page. The app then superimposes a 3D computer generated model of the furniture piece of interest over an image of the room and anchored to the catalog's position on the floor (see URL www.fastcodesign.com/3024113/this-crazy-app-makes-a-magazine-an-interior-design-tool). Yet another example of AR-based interior design includes those described by international patent application publication WO 2014/048497 to Wang et al. titled "Method of Image Processing for an Augmented Reality Application", filed Sep. 28, 2012.

Still another interesting AR experience includes a toy construction system described by international patent application publication WO 2012/160055 to Muthyala et al. titled "A Toy Construction System for Augmented Reality", filed May 22, 2012. Muthyala describes LEGO®-style construction blocks that physically couple with a computer-recognizable marker. A device such as a computer can then display content relative to the marker on a display screen.

AR experiences available to consumers can be quite complex and interactive. In order to provide such rich experiences, content developers require complex development environments to create the experiences in the first place. Even simple AR experiences can require arcane tools or a significant amount of effort by a developer. Further, existing development tools are beyond the ability of a non-technical consumer to create their own experiences.

There are numerous AR content development tools available. For example, U.S. patent application publication 2010/0164990 to Van Doorn titled "System, Apparatus, and Method for Augmented Reality Glasses for End-User Programming", filed internationally on Aug. 15, 2006, describes an environment where an end-user programmer is able to visualize an ambient intelligent environment. Still, the end user must be technically astute in order to create desirable content. Another complex authoring tool is described in European patent application EP 2 490 182 to Ooi et al. titled "Authoring of Augmented Reality", filed Feb. 6, 2012. In the Ooi approach, an author must navigate complex menus and interfaces in order to create their desired content.

Further effort has been applied to toward providing access to AR content. For example, U.S. Pat. No. 8,682,879 to Kim et al. titled "Marker Search System for Augmented Reality Service", filed Apr. 16, 2010, describes a system where a search engine returns markers in response to a key word search. The markers can be identified by a device and, in turn, the device can obtain web content based on the marker. The content, an image for example, can then be superimposed on a display of the device. Although useful in accessing AR services, Kim still fails to provide insight into how a layperson can generate their own AR content with ease.

Even further progress is made by Berry et al. as described in the paper "The Augmented Composer Project: The Music Table" (Proceedings of the Second IEEE and ACM International Symposium on Mixed and Augmented Reality (ISMAR 2003)). Berry describes a system where users are able to learn about music through an AR system. The user creates patterns of cards and the AR system converts the patterns into musical phrases while also superimposing AR content on images of the cards. Unfortunately, the approach taken by Berry only leverages individual pieces of music bound to a card. Further the Berry approach does not provide for interactivity among the AR content. For example, the musical patterns generated by the cards are merely individual pieces of music played as the same time rather than inter-connectable functional elements through which more complex content can be created.

Thus there remains a need for AR authoring tools that would allow consumers to generate AR content in a simplified fashion.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present inventive subject matter. It is not an admission that any of the information provided herein is prior art or relevant to the presently claimed inventive subject matter, or that any publication specifically or implicitly referenced is prior art.

In some embodiments, the numbers expressing quantities of ingredients, properties such as concentration, reaction conditions, and so forth, used to describe and claim certain embodiments of the disclosure are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the disclosure may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the various embodiments of the present disclosure.

Groupings of alternative elements or embodiments disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

BRIEF SUMMARY

The inventive subject matter provides apparatus, systems and methods in which a one can leverage an augmented reality (AR) authoring tool to create content based on using real-world objects. One aspect of the inventive subject matter includes an embodiment of an authoring tool, a computing device for example, comprising a recognition engine and a content creation engine. The recognition engine includes one or more computing modules that configure the recognition engine to identify known markers based on detected signatures from a digital representation of a physical environment. The recognition engine can be configured to or programmed to receive a digital representation of a set of markers within the physical environment, where the digital representation could include image data, video data, or other types of digital data. The recognition engine continues processing the digital data by identifying one or more markers from the digital representation. The recognition engine further uses identities of the markers as recognized from the digital representation to identify inter-connectable AR object primitives where the AR object primitives represent portions of content that can be computer generated (e.g., graphics, solids, game elements, etc.). For example, the identities of the markers (e.g., GUIDs, indices, etc.) can be used to query a primitives database for corresponding AR object primitives. In some embodiments, each marker can have one or more corresponding AR object primitives. Further, each AR object primitives can include a primitive interface through which it can couple to other AR primitives. The content creation engine also comprises a collection of modules that configure the content creation engine to build an AR content set from the AR object primitives. The content creation engine can obtain a content creation rules set comprising instructions or commands that govern how the AR object primitives are to be bound together. The content creation engine is further configured or programmed to obtain a set of AR content primitives based on or including the AR object primitives provided by the recognition engine. The content creation engine, following the content creation rules set, binds the AR content primitives together via their corresponding primitive interfaces to generate an AR content set. Once the AR content set is suitably instantiated, the content creation engine can cause a device, perhaps the tool itself, to present the AR content set on a display where the AR content set is superimposed on an image of the physical environment.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
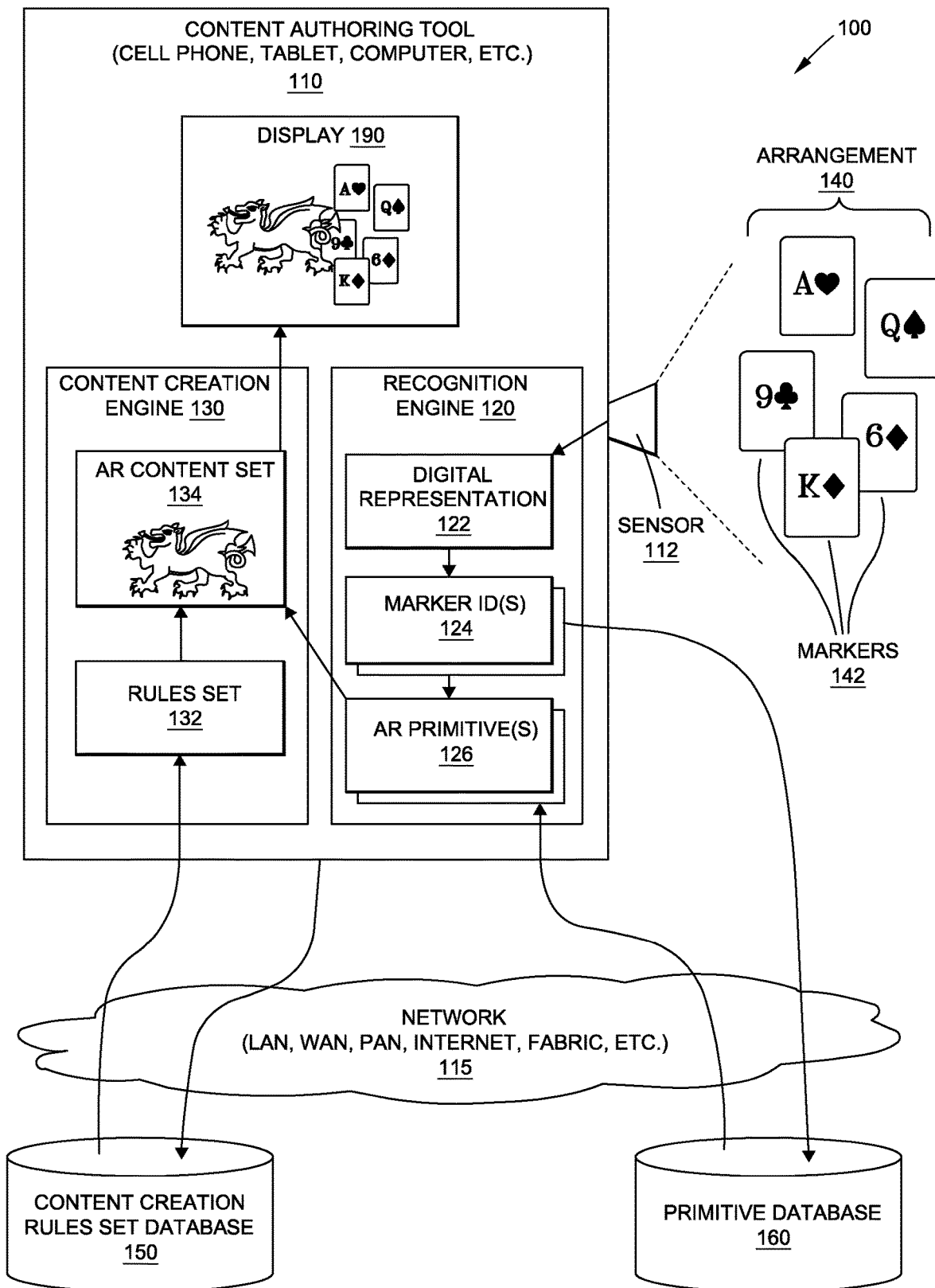
FIG. 1 is a schematic overview of a device operating as an augmented reality content authoring tool.

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including enabling a computing device to operate as a digital augmented reality (AR) content authoring tool. The computing device is configured or programmed to digitally recognize known markers and map the markers to digital AR content primitives. As an author organizes or arranges the markers in a physical environment, the computing device detects the changes and re-configures the device's memory, processor, or other computing elements to enable the AR content primitives to aggregate together according to the marker arrangement. The aggregate of the AR content primitives gives rise to new AR content that can be presented on a digital device's display.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networking environment, the terms "coupled to" and "coupled with" are also used euphemistically to describe two or more networked computing devices that are communicatively connected with each other over a network, possibly via one or more intermediary devices.

FIG. 1 illustrates a possible schematic overview of AR content authoring system 100 where a computing device is configured or programmed to operate as content AR authoring tool 110. In the example shown AR authoring tool 110 is illustrated as a unitary computing device, which can comprise a non-transitory computer readable memory (e.g., RAM, FLASH, ROM, HDD, SSD, etc.) and one or more processors (e.g., ASIC, FPGA, multi-core processor, Intel i7®, AMD, ARM, etc.). Software instructions are stored in the memory and configure the device processor(s) or processor cores, through execution of the software instructions, to fulfill the roles or responsibilities of content authoring tool 110 as described herein.

Although content authoring tool 110 is illustrated as a unitary device, it should be appreciated that content authoring tool 110 could also take on different forms depending on the nature of the authoring environment. In some embodiments, the components of content authorizing tool 110 can be distributed among other computing devices in AR content authoring system 100, possibly distributed over a network 115 (e.g., Internet, WAN, LAN, personal-area-network, VPN, P2P network, ad-hoc network, wireless network, wired network, 802.11, Wi-GIG, Bluetooth, etc.). For example, recognition services provided by recognition engine 120 could be provided by a recognition server (e.g., HTTP server, cloud server, etc.) via a web-services API. Further, sensor 112 could be a remote camera located on another computer, perhaps through a video chat application (e.g., Skype®, Zoom®, etc.). Thus, content authoring tool 110 can comprise a unitary device or a federation of distributed computing devices that coordinate their behaviors over network 115.

In convenient embodiments, as illustrated, content authoring tool 110 can be integrated into an easily accessible computing device, possibly including a smart phone, cell phone, tablet, phablets, game console or device, a camera, robot, augmented reality viewer (e.g., Google® Glass®, Oculus™ Rift™, etc.), a smart watch, or other type of mobile computing device. One of the myriad advantages of the disclosed technology is that it enables AR content authoring on such devices that have been traditionally extremely difficult to use for computer programming as well as for AR content creation. For the sake of discussion, the inventive subject matter will be presented from the perspective of a tablet device having a software application or "app" that configures or programs the tablet to operate as content authoring tool 110. Further, the inventive subject matter will be presented from the perspective of creating AR content as part of a child's entertainment product.

Content authoring tool 110 comprises several components to facilitate easy generation of AR content represented by AR content set 134. In the example shown, content authoring tool 110 includes recognition engine 120 and content creation engine 130. Content authoring tool 110 could also include one or more of sensor 112 that captures digital representation 122 of a physical environment having one or more of markers 142 placed into arrangement 140. It is also possible, but not required, that content authoring tool 110 could include or incorporate primitive database 160 or rules set database 150, rather than accessing such databases over network 115. Recognition engine 120 represents a computing recognition module (i.e., hardware and software) that recognizes markers 142 and arrangement 140 from digital representation 122, and then maps the recognized markers into a collection of inter-connectable AR object primitives represented by AR primitives 126. Content creation engine 130 represents a computing module that binds AR primitives 126 into AR content set 134 according to one or more rules set 132 where AR content set 134 can be rendered for display on display 190.

Markers 142 represent real-world, physical items placed in a physical environment. In the example shown, markers 142 are illustrated as playing cards in order to convey the concept that any type of recognizable object could serve as a marker 142. The term "marker" is used euphemistically to represent objects that have been registered to one or more AR primitives. In some embodiments, markers 142 could be elements of a toy, perhaps action figures, building blocks (e.g., LEGO® bricks, wooden blocks, etc.), or other type of toys. Markers 142 preferably comprise sufficient digitally detectable features that, when existing in one or more modalities of digital data, can be identified via processing algorithms executed on the digital data. For example, markers 142 could comprise custom-made cards having pictures or images that further include a detectable scale invariant set of features (e.g., SIFT descriptors; see U.S. Pat. No. 6,711, 293 to Lowe titled "Method and apparatus for identifying scale invariant features in an image and use of same for locating an object in an image" filed Mar. 23, 2000), the substance of which is incorporated herein by reference. Examples of markers 142 could include cards (e.g., trading cards, playing cards, game cards, etc.), 3D objects (e.g., toys, action figures, machine parts, tokens, or other objects having detectable textures, etc.), building blocks, printed matter (e.g., magazine articles, newspaper articles, printed images, books, credit cards, etc.), electronic displays of external devices, such as tablets, smartphones or smart watches where the various displays can be arranged to create an AR display (e.g. a group of individuals can combine smart watches or smartphone screens to create a visible content) or other types of objects.

Consider a scenario where the set of markers 142 are associated with a toy, perhaps associated with the Pixar® Cars® brand. Each of markers 142 could comprise a collectible trading card having one or more images from the Cars movies. Further, the cards can be associated with a purpose-built AR app for mobile devices that can enhance the play value of the cards. For example, each card could be associated with racetrack primitives (e.g., start, finish, ramp, obstacles, curves, straights, hills, etc.) where the AR app can recognize the cards and bind their individual racetrack primitives into a complete racetrack based on arrangement 140 of markers 142.

It should be appreciated that arrangement 140 may be more than a mere collection of markers 142. The physical placement or juxtaposition of markers 142 in arrangement 140 carries meaning with respect to how AR content set 134 should be instantiated. Thus, arrangement 140 could be considered as instructions that contribute to construction of AR content set 134, and should be considered as influencing how AR content set 134 behaves. The approach of using arrangement 140 to influence or dictate how AR primitives 126 integrate with each other has many advantages, not the least of which is enabling a non-technical individual, a child for example, to quickly re-arrange markers 142 to give rise to a different version of or a new version of AR content set 134 without requiring the author to be technically or computer savvy. For example, a child could construct a racetrack based on arrangement 140 as a game level to be played with friends. Then, the child could completely change arrangement 140 (e.g., add cards, remove cards, shift cards around, stack cards, etc.) to generate a completely new racetrack. In the example shown, markers 142 comprise a circular arrangement. However, it should be further appreciated that arrangement 140 could comprises other arrangements possibly including a linear arrangement, hierarchical arrangement, a tree arrangement, a stacked arrangement, a 3D arrangement, or other types of arrangements. In some embodiments arrangement 140 can also comprise a temporal arrangement where markers 142 can shift location, position, orientation, or other configuration in time.

Recognition engine 120 is configured or programmed to receive digital representation 122 of arrangement 140 of a marker set of markers 142 in a physical environment. Digital representation 122 can be captured by one or more of sensor 112 and can reflect one or more data modalities. In more preferred embodiments, sensor 112 comprises a digital camera (e.g., CCD, CMOS, etc.) that generates image data as digital representation 122. For example, the image data could include still digital images (e.g., BMP, JPG, PNG, etc.), video frames, video data (e.g., MPEG, etc.), or other types of image data. In some embodiments, content authoring tool 110 leverages an integrated sensor 112 to obtain digital representation 122. In other embodiments, content authoring tool 110 can receive digital representation 122, possibly over network 115, from a remote sensing device having sensor 112. Other data modalities could also include audio data, kinesthetic data, tactile data, biometric data in cases where markers 142 comprises living or animate objects, motion data (e.g., acceleration, etc.), or other types of digital data modalities. It should be appreciated that sensor 112 is a device configured to capture a version of digital representation 122 that is complementary to the detectable features of markers 142 or arrangement 140. Thus, depending on the target modality of markers 142, sensor 112 could also comprise a biometric sensor, microphone, tactical sensor, GPS sensor, accelerometer, or other type of sensor.

Recognition engine 120 is further configured or programmed to identify each of marker 142's identity in the marker set from digital representation 122. Referencing back to the example of digital representation 122 comprising image data, recognition engine 120 can execute one or more implementations of image processing algorithms to generate features from the image data. One example of an image processing algorithm includes SIFT referenced previously. Recognition engine 120 can execute an implementation of SIFT on the image data, which results in a set of SIFT descriptors (e.g., 128 byte values representing a gradient orientation histogram of an image patch). Alternative or additional image processing algorithms for deriving image features include, BRISK, SURF, FAST, BRIEF, Harris Corners, Edges, DAISY, GLOH, HOG, EOG, TILT, VLAD, or others known or yet to be invented. Implementations of each of the algorithms generate data structures comprising representations of some form of features (e.g., descriptors, corners, key points, etc.). The features generated by the implementations of the algorithms can be used to retrieve information bound to markers 142.

The identity of each of markers 142 can take different forms. For example, a marker's identifier could comprise some form of number or value (e.g., an index into a table, a GUID, UUID, an address, a set of descriptors, etc.). The identification can be determined by mapping the features derived from digital representation 122 to known identifiers of known markers 142. For example, in some embodiments, the marker identifiers can be stored in a tree structure (e.g., kd-tree, spill tree, etc.) that is arranged in memory based a priori known features of known markers. When digital representation 122 is analyzed by recognition engine 120, the resulting features can be compared to the known features in the tree to determine which known features are nearest neighbors to the observed features. The result set of known features can then be used to obtain corresponding known identifiers of known markers 142. The identifiers of markers 142 can be stored in alternative structures as well, for example markers 142 could be stored in a remote database where the marker identifiers are indexed based on known derivable features of the known markers. In some embodiments, the known features of markers 142 could be the marker identifier. Example techniques for recognizing objects at target objects and returning target object information such as marker identifiers that could be suitably adapted for use with respect to the inventive subject matter includes U.S. Pat. Nos. 7,016,532; 8,224,077; 8,224,078; and 8,218,873 all to Boncyk et al, each of which are incorporated herein by reference.

Recognition engine 120 is further configured or programmed to identify at least one inter-connectable AR object primitive for each marker 142 in the marker set from each of the marker's identity. In the example shown recognition engine 120 compiles a set of marker identifiers and constructs one or more queries targeting the indexing system of primitives database 160. The query could comprise a submission of all the identifiers, perhaps packaged as XML or JSON file, sent to primitives database 160 over network 115. Still in other embodiments, primitives database 160 could comprises an internally stored look up table (e.g., direct table, hash table, dictionary, etc.) where one or more of AR primitives 126 are stored. In such a scenario, recognition engine 120 can simply retrieve desired information from the look up table. With regard to the inventive subject matter described herein, markers can represent both terminals and non-terminals when using grammar definitions in context-free grammars which permits a compact representation of the potentially complex mappings between marker configurations and their meanings.

In response to receiving the query of marker identifiers, primitives database 160 returns a result set having one or more AR primitives 126 representing inter-connectable AR object primitives. The result set could comprise the data objects and their associated content, or could include pointers to other locations over network 115 or in memory of where the objects can be found. For example, the result set might include file names in a local file system where AR primitives 126 can be found on the presentation device.

Primitives database 160 also could take on different forms depending on the desired experience. In some cases, primitives database 160 might be purpose-built only having indexed AR primitives 126 that are relevant to the installed application. Returning to the racetrack example discussed above, primitives database 160 might include all racetrack primitives associated with a collectible card set, and only those racetrack primitives. Such an approach is advantageous for creating highly accurate and specific applications, but may lack versatility. In other embodiments, primitives database 160 might include a broad spectrum of primitives across numerous possible types of applications. However, the broad spectrum approach provides for high versatility, but can generate false positive matches that could detract from the user experience or consume excessive resources on the presentation device. Still further, the author could construct or populate primitives database 160 by correlating observed markers 142 to known primitives. A custom approach allows the author to create a highly personalized interface and experience.

AR primitives 126 represent basic inter-connectable building blocks through which the author can generate a desired AR content set 134. Each of AR primitives 126 could be considered individual executable modules having code or data that gives rise to AR elements. Each of the AR elements, could be rendered individually, but would likely not be of much interest. Rather, through stitching together AR primitives 126 based on markers 142 and their arrangement 140, the author can generate quite complex new AR content sets 134. Consider again the racetrack example. AR primitives 126 might represent a curve, a straightway, a start, a finish, and obstacles. Each of these elements is uninteresting individually by themselves. However, through arrangement 140, a child could construct an infinite number of racetracks, perhaps as a game level for an AR or computer game.

Depending on the nature of the actual embodiment and target capabilities, AR primitives 126 could be widely different. For example, AR primitives 126 could comprises game primitives, program coding primitives (e.g., variable assignments, conditional logic, loops, etc.), chemical element primitives, electronic schematic primitives, physical primitives (e.g., simulation primitives), or other types of primitives. Many of these types of AR primitives are discussed in greater detail near the end of this document with respect to various use-cases. Once content authoring tool 110 has access to AR primitives 126, content creation engine 130 can engage with AR primitives 126 to give rise to AR content set 134.

In some embodiments to aid in construction of AR content set 134, content creation engine 130 is configured or programmed to obtain content creation rules set 132. Rules set 132 represents instructions by which or according to which content creation engine 130 binds AR primitives 126 together. Content creation engine 130 can obtain one or more of rules set 132 through various techniques. In purpose-built embodiments, a specific AR application executing on content authoring tool 110 could be a priori provisioned with an application-specific rules set 132 integrated into the application. Still, in other more generic embodiments, content authoring tool 110 can leverage ambient device information or observed information to construct a query targeting the indexing schema of content creation rules set database 150. For example, content authoring tool 110 could compile a set of attributes-value pairs representing a current context of the device. The attribute-value pairs might represent a location, a time, an event, a user preference, a digital right, a purchased license, or other contextual information. In response to receiving the query, content creation rules database 150 returns one or more rules set 132 to content creation engine 130. Still further, rules set 132 might be indexed according to known features from one or more of markers 142 or their specific arrangement 140. Thus, content creation engine 130 can be configured to select rules set 132 from multiple rules sets based on recognizing the set of markers 142 or based on the device context.

Rules set 132 can include various requirements, conditions, parameters, or other factors that facilitates integration of AR primitives 126. For example, AR primitives 126 might represent generic AR primitives and rules set 132 could include rules for customizing AR primitives 126 to a specific use. Consider an example where AR primitives 126 represent castle building structures bound to purchasable princess trading cards. Each AR primitives 126 might represent different parts of a castle; say a parapet, draw bridge, wall, or other type of structure. However, as a default, all the AR primitives 126 might be rendered in pastel pink. A child could change their personal preferences to indicate they prefer a different rendering color; perhaps blue. In response, rules set 132 carries specific instructions to alter the defaults of AR primitives 126 to give rise to a blue castle on display 190 rather than a pick castle. Thus, rules set 132 can carry additional content information or programming that might not ordinarily be part of AR primitives 126. Still, it is possible, especially in application-specific or purpose-built applications, for AR primitives 126 to comprise sufficient rules sets 132 for instructing content creation engine 130 on how to bind AR primitives 126 together.

Content creation engine 130 is further configured or programmed to obtain the set of AR primitives 126 where the primitives are inter-connectable among each other. In embodiments as illustrated, AR primitives 126 are already local to content creation engine 130. However, in other distributed embodiments, content creation engine 130 might be required to receive AR primitives 126 over network 115 from a remote device operating as recognition engine 120 or from other devices. Each primitive in the set of AR primitives 126 comprises a least one primitive interface through which is it able to interact with other primitives. The primitive interfaces could be considered a programming application programming interface (API), among other types of interfaces, and is described more fully with respect to FIG. 2.

With AR primitives 126 in hand and optional rules set 132, content creation engine 130 is configured to generate AR content set 134 by coupling two or more of AR primitives 126 together via their respective primitive interfaces according to content rules set 132 and as a function of arrangement 140. From a simplified perspective, output interfaces of one primitive can couple to the input interfaces of one or more other primitives. In a more implementation perspective representations, references or pointers to a primitive's data structures and elements (e.g., content, code, etc.) can be passed through an API to another primitive.

It should be appreciated that arrangement 140 directly influences how rules set 132 should be executed on AR primitives 126. For example, arrangement attributes derived from arrangement 140 can represent inputs into a primitive's interface. More specifically, the relative distance in the physical environment between two of markers 142 could be used to influence the interaction between the two corresponding AR primitives 126; perhaps representing a coupling force strength in a physical simulation for example. Example arrangement attributes that influence the function by which AR primitives 126 are coupled could include relative proximity in arrangement 140, relative orientation in arrangement 140, location in arrangement 140, movement in arrangement 140, stacking in arrangement 140, temporal changes, or other observable factors.

In some embodiments, content creation engine 130 couples primitives based on a pair-wise juxtaposition of markers 142 in arrangement 140. The pair-wise juxtaposition represent a comparison of relative proximities, locations, positions, or other arrangement attributes. A pair-wise approach allows content creation engine 130 to determine which markers 142 should be bound together. For example, in the example shown the King of Diamonds is physically stacked on the Nine of Clubs and the Six of Diamonds. Thus, content creation engine 130, based on rules set 132, could bind AR primitives 126 for these three cards together rather than binding the King of Diamonds AR primitive with the Queen of Clubs AR primitive for example. It should be further appreciated, that more than two primitives (e.g., three, four, or more) could be coupled together via their respective interfaces.

Once AR content set 134 is sufficiently instantiated, content creation engine 130 can cause a device, likely content authoring tool 110, to present AR content set 134 on display 190. For example, referring back to the racetrack example, AR content sent 134 might be a fully instantiated racetrack that can be superimposed on an image of the physical environment, perhaps even relative to or anchored to images of markers 142 in arrangement 140. One should note that in some embodiments, AR content set 134 is presented on display 190 in real-time relative to capturing digital representation 122. Thus, content creation engine 130 can be configured to update AR content set 134 based on movement of markers 142 within the physical environment. Such an approach is advantageous because it enables non-technical individuals to quickly react to or address undesirable compositions of AR content set 134 and then create modifications. In such cases, content creation engine 130 can track positions of markers 142 in real-time as well in order to determine new arrangement 140 and corresponding AR content sets 134.

Although the main examples of the inventive subject matter focus on toys, it is contemplated that the disclosed techniques can be applied to many other areas or markets where AR content set 134 takes on corresponding aspects. For example, within a programming context, AR primitives 126 could represent programming constructs and AR content set 134 represents programming code (e.g., executable scripts, compliable code, etc.). In a toy or gaming context, AR content set 134 could include video gaming elements (e.g., levels, tracks, AI behaviors, etc.) or even a virtual game board. Still further, in the context of executing a simulation, AR content set 134 might represent a digital model (e.g., CAD system, architecture, etc.). Even further, AR content set 134 might be a simulation (e.g., chemical reactions, gravity simulation, building modeling, etc.) or perhaps an initial state of a simulation possibly as part of an educational or training environment. As a more concrete example, AR primitives 126 might represent chemical elements in a particular arrangement where AR content set 134 then represents a chemical compound (e.g., small molecule, Kinase inhibitor, drug, DNA, RNA, etc.). More complex versions of AR content set 134 could comprise a control system built from AR primitives 126, perhaps a remote control of a device or robot for example. Interestingly, AR content set 134 could also comprise an error indicator if markers 142 fail to fall within an acceptable arrangement. For example, the error indictor could indicate possible programming syntax or semantic errors, incompatible AR primitives 126, recommendations on a possible rearrangement, or other type of error conditions. Furthermore in the context of AR primitives representing puzzle pieces, AR content set 134 could indicate where two markers 142 fail to properly interconnect.

Yet another interesting example includes using AR content set 134 to give rise to a new AR primitive 126, where AR content set 134 composes one or more new primitives. For example, AR content set 134 might represent an AI behavior for a gaming character. The AI behavior can be registered to an existing marker 142 or a new marker. This new AR primitive then can become available as a building block for new, even more elaborate AR content sets 134. An astute reader will realize that AR content set 132 can be saved in memory for future use.

Figure 2:
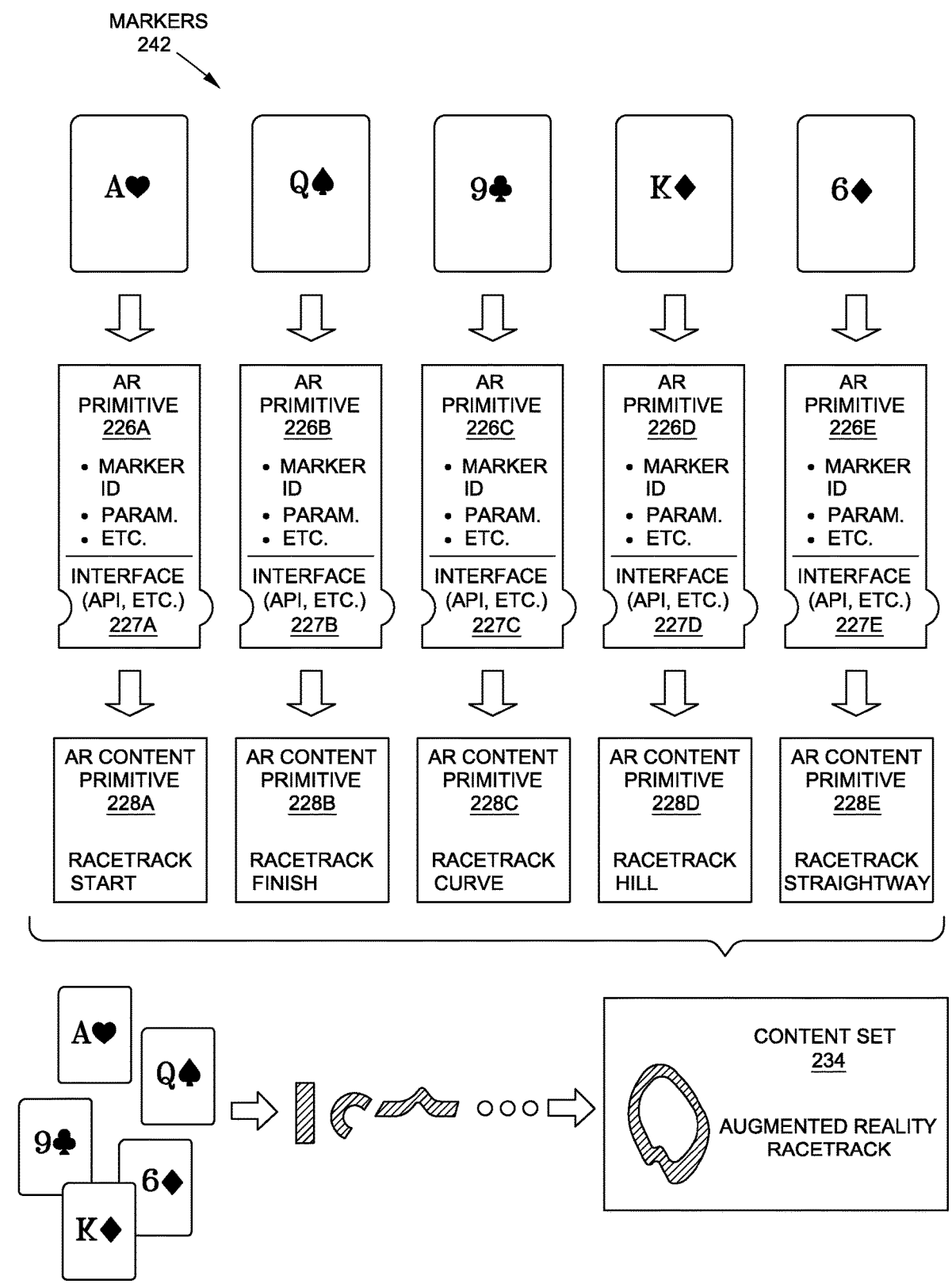
FIG. 2 presents an example of combining AR content primitives into a complete content set based on recognized markers.

FIG. 2 presents a more detailed example of combining AR content primitives into a complete content set based on recognized markers 242. In this example, markers 242 are illustrated as traditional playing cards. Each card has been registered with a corresponding AR primitive represented by AR primitive 226A through 226E, collectively referred to as AR primitives 226. It should be appreciated that the cards can be registered by deriving digital features (e.g., descriptors, values, identifiers, etc.) from digital representations of the cards, then binding the digital features to AR primitives 226. Each of AR primitive 226 can include data elements that aid in constructing AR content set 234; an augmented reality racetrack in this example. Examples of data elements can include digital graphics, digital sound data, metadata, relevant APIs, implementations of algorithms, or other data that can be stored in memory for rendering or presenting the AR primitives.

AR primitives 226 can be tagged with data elements such as a marker identifier (e.g., index, GUID, etc.), which allows a recognition engine to identify which of AR primitives 226 are bound to which markers 242. Further, AR primitives 226 can also include one or more configuration parameters that could be adjusted manually or automatically as a function of the arrangement of markers 242. The parameters depend heavily on the nature of the target use-case, but might include graphical parameters (e.g., size, shape, color, lighting, albedo, etc.), duration in time, force strength in a simulation, or other type parameter.

Of specific interest, each of AR primitives 226A through 226E includes at least one corresponding interface 227A through 227E, respectively, and collectively referred to as interfaces 227. In some embodiments, each of AR primitives 226 has its own internal interface 227, perhaps operating as an API as illustrated. In other embodiments, interfaces 227 could be identified via an address (e.g., pointer, URL, etc.) through which other interfaces exchange data with the corresponding AR primitive 226. For example, interface 227B might be a web service accessible via a URL where an intermediary interface server brokers communications among AR primitives 226. Thus, the inventive subject matter is considered to include providing AR primitives 226 via one more web services; perhaps as AR as a Service (ARaaS). Still further, as in the racetrack example, interfaces 227 could comprise a graphic interface via which each of AR primitive 226 is able to graphically integrate with other AR primitives 226.

Each of AR primitives 226 also comprises AR content primitive 228 that represents the digital content to be rendered as part of content set 234. In this example, the Ace of Hearts maps to AR content primitive 228A, which represents a graphical representation of a racetrack start line. The Queen of Spades maps to AR content primitive 228B, which represents a graphic representation of a racetrack finish line. Still further, the Nine of Clubs maps to a graphical representation of a curve as indicated by AR content primitive 228C. The King of Diamonds maps to a hill-type obstacle as shown by AR content primitive 228D. Finally, the Six of Diamonds maps to AR content primitives 228E representing a straightway. Each of these race track primitives, in this embodiment, includes one or more splines. As the primitives are combined, the splines are combined to form smooth graphical curves.

The content creation engine combines or otherwise integrates AR content primitives 228 into AR content set 234 as shown by the graphical flow at the bottom of FIG. 2. The content creation engine uses the parameters from AR primitives 226 as well as the arrangement of markers 242 to determine how to aggregates AR content primitives 228 into AR content set 234. More specifically, each rack track primitive is adjusted or transformed (e.g., stretched, narrowed, bent, etc.) so that it is integrated with a neighboring primitive according to one or more content creation rules set; spline interpolation for example. Should the track author wish to make a change, the author need only modify the arrangement of markers 242. The AR racetrack in content set 234 can then be saved, edited, modified, deleted, or otherwise modified in preparation for play. Further, content set 234 can be packaged and sent to other electronic devices. For example, the racetrack can be sent to other tablet computers to create a shared racing experience among multiple game players.

Figure 3:
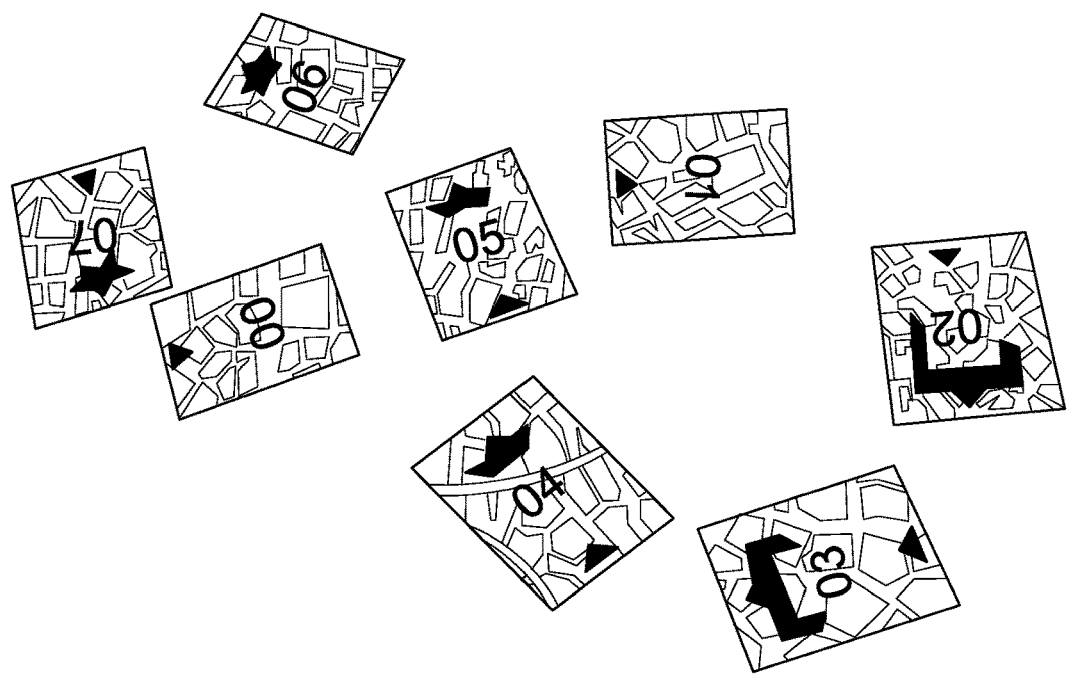
FIG. 3 presents an example set of real-world markers placed in an arrangement.
Figure 4:
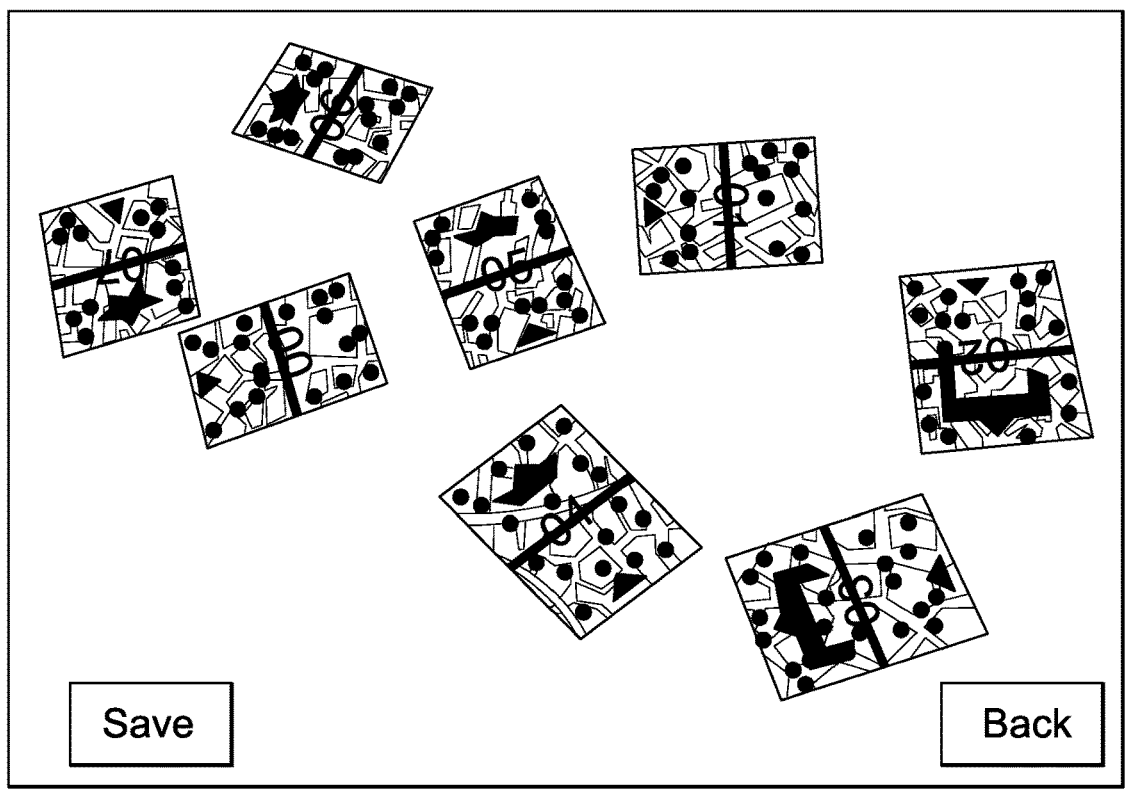
FIG. 4 illustrates recognition of the real-world markers in FIG. 3 via a hand-held device.
Figure 5:
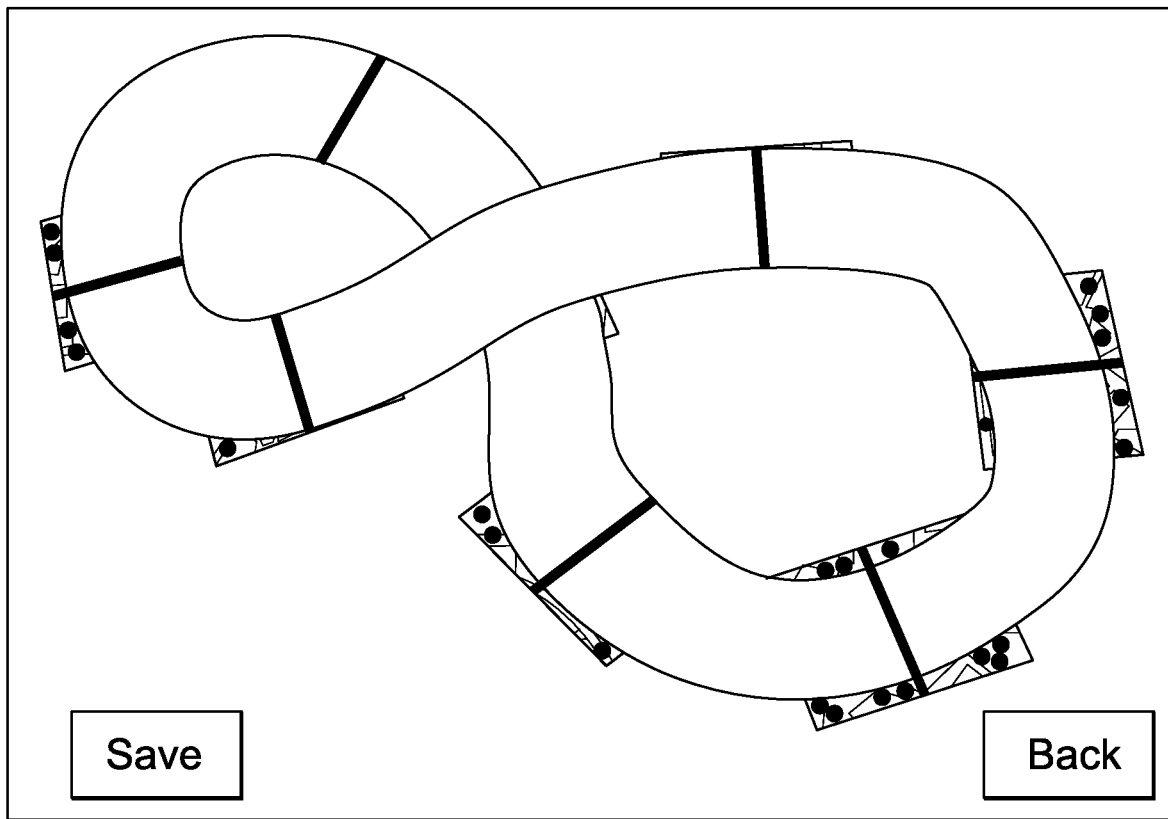
FIG. 5 illustrates the creation of AR content based on the arrangement of the markers in FIG. 3.

FIGS. 3-5 presents a real-world example an AR authoring tool built to leverage real-world markers and to generate a virtual racing track for a video game. FIG. 3 presents an arrangement of eight real-world cards representing markers. In the example shown, the cards are sized and dimensioned to match traditional playing western playing cards or trading card; 2.5"×3.5". Each card has multiple features of interest.

Each of the cards has one or more icons indicating the nature of the corresponding primitive associated with the cards. The icons as shown in FIG. 3 are located at the top and/or bottom of the cards, but may be positioned as desired or for effective recognition. Such icons can serve several purposes. First, as indicated, the icons can provide a human understandable indication of the nature of the corresponding primitives. In this example, the icons can indicate straight ways, curves, ramps, or other virtual race track primitives. Further, the icons could also be interpreted by the AR authoring tool to establish a relative position or relative orientation of cards with respect to other cards, the camera, or with respect to the entire arrangement if desired.

The cards may also include human readable numbers. The numbers can also serve several purposes. With respect to human interactions, the numbers allow a user to easily distinguish one card from another. Such an approach is considered advantageous in embodiments where multiple, similar cards might be present or available for collection. For example, notice card 02 and card 03 have the same icons, although their background is different. The numbers can aid a human, or a machine for that matter, in quickly distinguishing similar cards from each other. In some embodiments, such cards might be collectible in the sense that they are produced according to a rarity policy (e.g., common, uncommon, rare, ultra-rare, chaser cards, unique, etc.). Therefore, having such numbers or other human readable indicia can help to distinguish cards of different rarity.

Of more specific interest, each card in this example also includes unique background art so that each card can be uniquely identified by the authoring tool based on executing one or more implementations of image processing algorithms on image data representing the arrangement. In this specific example, the background art comprises images of sections of a dried mud flat, where the resulting pattern of cracks can be considered to have observable features at different scales (i.e., distances between the camera and the arrangement), or considered to have a fractal dimensionality for greater scale invariance. It is contemplated by the disclosed technology that in addition to the features of the markers that are recognizable by the imaging or scanning device, that one or more of the markers could have recognizable features that are below the sensitivity or resolution of sensor (i.e. camera) to provide a basis of determining authenticity of the marker (i.e. counterfeiting prevention).

The author in this example has chosen to place the cards in a loose figure eight arrangement. Note that card 05 is between cards 00 and 01. Still, a path can be traced from card 00 through card 05 on to card 01. The path continues from card 01 to card 02, then onto cards 03 and 04, which in turn lead to card 05. The path proceeds from card 05 to card 06, then finally to card 07, which leads back to card 00.

In FIG. 4, a user leverages a tablet device configured to operate as an AR authoring tool to create a virtual race track based on the arrangement of the cards from FIG. 3. FIG. 4 represents a tablet screen, with a display of the arrangement of cards from FIG. 3 a viewed through a camera on board the tablet. The user directs the forward-facing camera of the tablet to the arrangement of cards. The authoring tool recognizes each individual card. In the screen as shown in FIG. 4, virtual authoring tool content is superimposed on the displayed images of the cards. The tool content includes dots which can be color coded, indicating where matching observable features are present (e.g., SIFT descriptors, etc.). These features show that the authoring tool is able to recognize each card individually and distinguish each card from each other. The tool content also includes a band (which can be color coded) across the middle of the cards. The band indicates the orientation of the corresponding card, which further indicates the resulting orientation of corresponding AR primitives; race track segments and associated splines in this case. It should be appreciated that nearly any type of authoring tool content can be presented to the user to aid in the user creating their final content (e.g., locations, positions, relative placements, error codes, recommendations on moving markers, etc.).

FIG. 5 illustrates a tablet screen showing the resulting virtual race track generated by the authoring tool based on the observed arrangement of cards in FIGS. 3 and 4. The tablet operating as the authoring tool collected corresponding race track primitives and interfaces them together to from a completed race track based on the arrangement of the cards. The author of the race track can, in real-time, shift position of one or more cards to change the arrangement, which in turn causes the tablet to instantiate a new version of the race track. Thus, the authoring tool supports real-time modification or creation of new content.

The reader is reminded about the previous discussion regarding card 05 placed between card 00 and card 01. In the race track shown in FIG. 5, rather than creating an intersection among cards 05, 00, and 01, the race track comprises a ramp over the track. The path of the track from card 00 to card 01 extends under the ramp created by card 05. Thus, card 05 provides an excellent example of how a primitive of one card, a ramp or hill in this case, can be interfaced with other primitives (i.e., cards 04 and 06) while not interfacing with other primitives based on the arrangement of the markers. As such it can be appreciated that in the interaction of the AR primitives, rules may be provided that address, and provide different interaction results based upon, among other things, marker orientation relative to another marker, distance to another marker, potential overlap with another marker and whether the subject marker is on top or below in the overlap, whether a third or more markers are in proximity, touching or overlapping. Also, API or interfaces can also correspond to the geometry of the physical markers. In card-like markers which sides are juxtaposed with other markers. In three dimensional markers, entirely different sets of rules may be implemented taking into account, among other things, stacking, juxtaposition, geometry, positioning, etc.

Although FIGS. 2-5 provides more detail with respect to authoring an AR racetrack, it should be appreciated that the disclosed techniques extend beyond authoring AR gaming content. Thus, the disclosed techniques of enabling a non-technical user to author content through an AR interface gives rise to numerous advantages and potential use-cases. The following discussion describes additional topics that are considered to fall within the scope of the inventive subject matter.

In view that the disclosed techniques enable authoring content via an AR authoring tool in a physical environment, it is also possible to allow real-world elements to influence the creation of the content. In some embodiments, the recognition engine can be configured or programmed to recognize non-marker objects (e.g., a toy, a person, a building, etc.) that have not been registered as markers. Upon recognition of such objects, the recognition engine can obtain object information, which can be used to influence the creation of the content set according to the content creation rules set. As an example, a magazine cover could be a priori ingested into an object recognition system. When the recognition engine of the authoring tool recognizes the magazine cover, the recognition engine can obtain information about that particular issue of the magazine possibly including page count, width, depth, length, advertisers, titles of articles, article content, or other type of information. Returning to the racetrack example, the content creation engine could leverage the object information to enhance the content set. Perhaps the racetrack would be modified to go around the recognized magazine, to go over the magazine but avoid the cover illustrations, or simply create virtual billboards around the racetrack displaying advertisements from advertisers or displaying content from the magazine. As referenced previously, suitable techniques for recognizing objects and obtaining object information are described in U.S. Pat. Nos. 7,016,532; 8,224,077; 8,224,078; and 8,218,873 all to Boncyk et al.

Another technique for modifying the content set based on observed real-world objects includes using observed estimated depth information. An estimated depth represents a distance from a sensor to an object in a scene. Some embodiments can leverage depth sensors the can directly measure a depth, possibly based on infra-red projected patterns. Example depth sensors include Microsoft® Kinect®, Leapmotion®, Primesense®, or other types of depth sensors. Further, it is also possible to estimate depth information from pixel information from multiple images (e.g., real-time video frames) without requiring a dedicated depth sensor. One example technique for generating depth estimates from images is described in U.S. patent application 2012/0163672 to McKinnon titled "Depth Estimate Determination, Systems and Methods", filed Dec. 20, 2011, the substance of which is incorporated by reference. When content creation engine obtains or receives depth estimates of the physical environment, the AR primitives and the content set can be modified to account for the depth information. Consider a scenario where the author is attempting to create an AR physics simulation, perhaps as part of an educational tool. The objects in the simulation (e.g., rendered interacting AR primitives) can interact with the physical environment as a function of the depth estimates.

Still another example of enabling an author to create content sets based on real-world objects includes incorporating real-world tools into the observable environment. For example, an architect might include a ruler or an architect's scale into a scene along with markers that are bound to AR primitives that represent building materials or building components. The recognition engine can recognized the scale as discussed above and the content creation engine can use the scale information to ensure the content set is presented properly to scale. As the architect re-positions their scale the content set can be re-rendered to reflect the changes in scale, orientation, location, or other parameter associated with the scale.

Depending on the nature of the AR primitives, in some embodiments the authoring tool can accept direct author interactions with the markers as input to the AR primitives. As the author makes gestures or generates other types of interactions (e.g., spoken commands, etc.), the content creation engine can alter the parameters of one or more primitives. For example, an author could physically tap a marker with their finger or hand to select options associated with the corresponding AR primitives (e.g., color, size, shape, etc.).

In the context of programming, perhaps a marker represents a loop structure. The program author could speak a number of iterations for the loop while pointing at the marker. In response, the recognition engine executes one or more implementations of automatic speech recognitions (ASRs) algorithm on the audio data to determine the loop count or condition. The content creation engine then inputs the count or condition into the content set. Other types of interactions with markers that could adjust parameters of corresponding AR primitives include real-time interactions, changing locations, changing orientations, flipping the markers, articulating the marker (e.g., changing a pose of an action figure, etc.), or other types of interactions. The advantage of such an approach is clear. Through such simple or natural interactions, an author can create complex content sets while lacking a strong technical background.

As discussed previously, the markers could be nearly any type of machine recognizable object. Although it is possible for the markers to comprise some form a code (e.g., bar code, QR code, matrix code, high capacity color barcode, glyphs, etc.), such an approach is less desirable because such markers would lack human understandable information or lack aesthetics with respect to an application. More preferred markers would be visually pleasing while also be relevant to the core application for which they are intended. Consider a trading card game (e.g., Card Wars™, Magic: The Gathering®, etc.). Each card can be registered as a marker and bound to appropriate AR primitives based just on the image content (e.g., printed art work, painting, colors, etc.) of the card itself rather than unappealing codes. As players play cards in their tableaus, the AR primitives can be combined to present content to each player based on the arrangement of the card in the tableaus. Also consider the Skylander Battlecast® card and gaming platform that provides the interactivity of a tablet with a collectors card. The disclosed technology could provide an enhanced gaming experience to this and similar platforms by allowing users the ability to not only recognize the card, but also allow recognition of the placement or arrangement of such cards in the visual queue of the electronic device employing the disclosed technology to provide further AR content than what is currently recognized. Likewise, the disclosed technology may enhance other gaming platforms such as PlayStation® Wonderbook® or similar platforms that employ AR content in a storybook type setting by providing markers that could be placed and recognized within the current platform to provide additional AR content.

The markers can be quite dynamic. In some embodiment, the markers can change their observable features with time in a manner that causes changes to the corresponding AR primitives, or even final content set. For example, a box, perhaps constructed like a large six sided die, might have electronic displays on each face (e.g., LCD display, e-paper, e-ink, etc.). The image on each face could change with time where each image might be considered a different marker or a different version of the same marker. Additional examples of time varying markers could include images presented on the display of a cell phone, a game device, or even a television screen. In some embodiments, television programming content could become a marker, perhaps where the corresponding AR primitives might include digital models of characters, scene props, advertisements, or other types of AR primitive content associated with the television programming.

An interesting aspect of the disclosed inventive subject matter is that the recognition engine should be able to recognize the markers in a manner that is substantially invariant to scale, at least to within practical limits of the sensors. For example, the recognition engine should be able to recognize an image-based marker if the marker subtends a large fraction of the field of view of the sensing camera (i.e., close to the camera), or if the marker subtends a very small fraction of the camera (i.e., far from the camera). In such cases, the markers can be constructed to include features that are observable as difference scales. In some embodiments, a marker generator can be configured to print out (e.g., 2D printer, 3D printer, etc.) markers having the necessary scale invariance. Interestingly, while some markers can be generated to have self-similarity at different scales to ensure proper recognition, perhaps based on a fractal dimensionality, it is also possible for markers to have dis-similar feature across multiple scales in a frequency space (e.g., some highs, some lows, and some mid-levels). The approach of constructing markers having dis-similar features at different scales allows a marker to be bound to different AR primitives based on scale or depth in a captured image. Returning to the racetrack example, a marker could be bound to AR primitives representing scenery. If the marker is at the rear of an arrangement from the point of view of a capturing camera, the observed features at this scale might indicate that the content set should integrate a set of virtual trees behind the track. If the marker is in the middle of the arrangement and the recognition engine observes mid-level features, the content set could generate a virtual billboard. If the marker is near the capturing camera and has observable fine grained features, the corresponding AR primitives might be virtual spectators.

The disclosed techniques also enable a broad spectrum of use-cases. As discussed above, content authors are able to create complex video games through integration of AR primitives based on their arrangement. Further, the approach opens opportunities for extending revenue of video game properties by creating collectible markers that enable fans to create new content for the games. Fans can purchase the collectible markers to unlock AR primitives and then create new levels for the video games through quick arrangement of their markers in a physical environment. The levels could be shared through video game forums, sold, licensed, or otherwise distributed as desired. As such, one potential objective is to create demand for new markers to unlock further AR content that can be used in games and other settings. In addition, the AR primitives can be updated for a particular marker, potentially creating additional secondary markets for content or as a loyalty reward. For example, a consumer could pay for different levels of content for the same marker, or the AR content related to a particular marker may change depending on a level reached in a game, or based upon customer loyalty to a particular brand or product line. Also the AR content displayed for markers could be dynamic so that changes in display can give rise to changing unlocked AR content.

Another use-case includes creating virtual or augmented board games. The markers can comprise game elements (e.g., cards, tokens, boards, dice, etc.). Many board games have complex rules that could be difficult to follow or tedious to manage during play. Through construction of board games or construction of a board game setup, the authoring tool or other device can take on the responsibilities for rules enforcement, or for virtually managing fiddly or tedious gaming components (e.g., chits, tokens, etc.). In one example, one or more arrangements of board game pieces form one or more AR sets. Also certain arrangements of board game pieces could unlock information that could be used in the physical game itself to provide advantages, or detriments to players.

There are a vast number of possible educational use-cases as well as practical use-cases. As discussed previously, markers can be bound to AR primitives representing programming modules or lines of code. For example, some effort in the past has been directed to simplify learning programing through presentation of displayed graphical icons; see the Scratch™ programming language developed by MIT (see URL scratch.mit.edu). Although Scratch is moderately accessible to children or other non-technical users, it still requires significant effort to construct programs. In the disclosed approach, rather than requiring a computer interface, the novice programmer can quickly rearrange markers to alter their program. Such an approach is considered advantageous because the learner would be engaged kinesthetically as well as visually. Further, Scratch only presents programming blocks in a 2D display. In the disclosed approach AR primitives of programming blocks can be arranged in a 3D environment, which gives rise to interesting capabilities, especially for visualization of multi-threaded applications or visualization of multi-dimensional data analysis. Similarly, in creating educational or business presentations, markers representing content could be placed in a desired arrangement in a physical environment and displayed in the form of slide decks providing a finished presentation to be displayed. Also, particular text can be assigned to markers, and a user could use an arrangement markers to create a document based upon the arrangement. For example in drafting contracts, a user could lay out certain markers representing boilerplate text, and the disclosed technology could generate display document. It appreciated that text assigned markers could be useful in creating any number of documents employing standard text.

Additional educational uses could include generating simulations for various purposes. In some embodiments that focus on electronics, the markers could correspond to AR primitives that represent electronic schematic primitives. Example electronic schematic primitives could include traces, power sources, diodes, transistors, resistors, inductors, grounds, capacitors, chips, amplifiers, gates, inverters, junctions, switches, connectors, meters, or other types of electronics. The corresponding content set could include a simulation of electricity flowing through a circuit that corresponds to the arrangement of the markers. The simulation of the circuit can be changed through modification of the arrangement of the markers, which allows the student to develop an intuition for how electronic circuits operate. Other educational uses include creating physics simulations (e.g., kinematics, gravitation, quantum mechanics, optics, EM fields, wave guides, antenna design, etc.) where students, or even engineers, can arrange markers corresponding to physical objects and then create simulations of the objects interacting.

In a more practical setting, the disclosed techniques could also be used in conjunction with design of new chemical compounds; drugs for example. The markers can be constructed to represent elements or compounds where the corresponding AR primitives represent 3D virtual constructs. Based on the arrangement of the markers in 2D space or 3D space, the content creation engine can illustrate various simulated strengths of bonds (e.g., pi-bonds, covalent bonds, ionic bonds, Van Der Waals forces, etc.) among the primitives. In a complex example, markers could represent very complex proteins. Such an approach allows a researcher to attempt to identify docking sites through intuitive manual manipulation rather than through exhaustive computational modeling. The content sent can generate an AR overlay indicating a calculated coupling strength.

Yet more uses could be quite varied. The techniques could be used to create a virtual model train system where track and train cars could be modeled based on markers. A choreographer could simulate a dance using markers that represent dances. In a similar vein a sports coach could simulate player positions or game plays using markers and associated AR primitives representing players. Additionally, as mentioned previously, markers could be used to generate control system interfaces for devices of equipment. The interface designer could explore the efficiency of a design quickly by simply changing corresponding markers. Also, the markers could be used in real world maintenance of machinery or assembly of products. In maintenance of machines for example, the disclosed technology could use markers to show where real-world objects fit on other real world objects due to proximity. In an unassembled toy or piece of furniture sold to consumers the disclosed technology could be a tool to be used as an assembly aid, for example the pieces to be assembled (or stickers applied to the pieces) could act as the markers and the AR content could demonstrate whether two pieces are intended to joined together or provide other vital information in helping with the construction of the product. Also, the markers of the disclosed technology can be employed with productivity software. For example, cards representing tasks could be laid out in a particular arrangement, such in order of proposed completion or over a calendar, and the technology could display AR content to assist the user in planning and efficient completion of tasks.

The markers could also be used as keys to unlock content based on their arrangement. Such a use-case allows for securing information as well as providing entertainment value. As an example, an arrangement of markers could unlock a virtual landscape, with each landscape feature tied to a particular marker or card, and the arrangement and positions creating transitions between landscape features. Such a landscape use could be used in a gaming environment for creating virtual cities, battlefields, playing fields, golf courses, among others uses. Also, a landscape use could be used in a more practical real world setting such as designing residential or commercial landscaping. A landscape architecture use could involve the design and layout of a golf courses, zoos and building complexes as some examples. Also, markers, such as cards could be used to lay out events for the temporary location of tables and seating such as social events (i.e. seating, table arrangement), objects or booths to be viewed or visited, such as art exhibits, convention halls. Card markers used with the disclosed technology could also be useful as visual aids in chemistry illustrations, educational demonstrations and physics demonstrations. Returning the theme of games, collectible objects (e.g., figures, toys, trading cards, etc.) could be bound to AR primitives that are a priori unknown to the author. As the author shifts corresponding markers around in various arrangements, the AR primitives might reveal themselves so that the author discovers the content through experimentation. More complex content can then be created and made available to others; thereby, give rise to a shared experience. Also, the disclosed technology can be used with collectible objects as a means of indexing. For example a user could arrange collectable objects and the disclosed technology could display a virtual museum providing information about piece in the collection, and to also potentially demonstrate the completeness of the collection, and to display to the user, where certain pieces are missing. Also the disclosed technology could on one hand catalog baseball cards for example, but also provide AR content based upon a particular arrangement of baseball cards. For example, completing a circular arrangement of the defensive infield of the 1979 Pittsburgh Pirates® from baseball cards could display the starting pitching rotation for the 1979 World Series® or provide other similar AR content.

Another interesting advantage to the disclosed approach is that the markers point to AR primitives. Thus, as desired, the AR primitives could be changed so that the same marker or sets of markers could point to newly created content. In a very real sense, the AR primitives could be considered as a type of multi-media programming where the markers or arrangement of markers become a broadcast station for the programming. Also, the disclosed technology could be useful in the marketing area where products themselves become the markers (or stickers or objects attached to the products) and marketers could define and re-define the properties of the AR primitives. For example, placing two or more bottled beverages from a well-known brand in an arrangement could be recognized the disclosed technology displaying AR content that could be used or leveraged as a reward. For example, the product arrangement could unlock a code that could be used for coupons or other rewards. The AR primitives could be changed and modified such that markers and arrangement of markers would only be recognized for a period of time (i.e. limited time offer). Also, the technology could be implemented in user based level editing where user subscribers (such as through a website subscription) can define properties of the AR primitives. Also, in crowd-building level editing, the users can define the AR primitives of the markers which could provide possible positions where markers could connect to each other.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

The above description is given by way of example, and not limitation. Given the above disclosure, one skilled in the art could devise variations that are within the scope and spirit of the disclosed inventive subject matter. Further, the various features of the embodiments disclosed herein can be used alone, or in varying combinations with each other and are not intended to be limited to the specific combination described herein. Thus the scope of the claims are not intended to be limited by the illustrated embodiments.

What is claimed is:

1. A content authoring tool comprising:
   at least one processor;
   at least one non-transitory computer readable memory for storing software instructions executable by said at least one processor to execute operations comprising:
   receiving a digital representation of a marker set comprising a plurality of markers in a physical environment;
   identifying at least one marker's identity in the marker set; and
   identifying at least one inter-connectable object primitive for the at least one marker in the marker set from the at least one marker's identity;
   applying a content creation rule from available rules based on a device context;
   obtaining a set of content primitives comprising the at least one inter-connectable object primitive for the at least one marker in the marker set, each object primitive including a primitive interface;
   generating a content set by positionally coupling at least two primitives in the set of content primitives via their primitive interfaces according to the content creation rule and a physical environment of the at least one marker corresponding to the at least two primitives; and
   causing a device to present the content set on a display.

2. The tool of claim 1, wherein markers in the marker set comprise physical cards.

3. The tool of claim 1, wherein markers in the marker set comprise three dimensional objects.

4. The tool of claim 1, wherein markers in the marker set comprise a scale invariant set of features.

5. The tool of claim 1, wherein the markers comprise features at multiple scales in the frequency domain.

6. The tool of claim 1, wherein the content creation rule comprises an application specific rule.

7. The tool of claim 1, wherein the available rules are further based on the marker set.

8. The tool of claim 1, wherein the primitives comprise program code primitives.

9. The tool of claim 1, wherein the primitive interface comprises an application program interface.

10. The tool of claim 1, wherein the primitive interface comprises a graphical interface.

11. The tool of claim 1, wherein the primitive interface comprises an intermediary interface server.

12. The tool of claim 1, wherein the content set composes a new primitive.

13. The tool of claim 1, wherein the at least two primitives are coupled via their primitive interfaces according to the content creation rule as a function of their relative proximity in the physical environment.

14. The tool of claim 1, wherein the at least two primitives are coupled via their primitive interfaces according to the content creation rule as a function of their relative orientation in the physical environment.

15. The tool of claim 1, wherein the at least two primitives are coupled via their primitive interfaces according to the content creation rule as a function of their location in the physical environment.

16. The tool of claim 1, wherein the at least two primitives are coupled via their primitive interfaces according to the content creation rule as a function of their movement within in the physical environment.

17. The tool of claim 1, wherein the at least two primitives are coupled via their primitive interfaces according to the content creation rule as a function of a stacking within the physical environment.

18. The tool of claim 1, wherein the content set is caused to be presented on the display relative to images of the marker set.

19. The tool of claim 1, wherein the operations further comprise tracking position of markers in the marker set.

20. The tool of claim 1, wherein the at least two primitives are coupled based on a pair-wise juxtaposition of markers in the marker set.

21. The tool of claim 1, wherein the operations further comprise updating the content set based on movement of markers in the marker set within the physical environment.

22. The tool of claim 21, wherein the operations further comprise updating the content set in real-time.

23. The tool of claim 1, wherein the operations further comprise registering at least one content primitive to a marker in the marker set.

24. The tool of claim 1, further comprising a mobile device that includes the at least one processor and the at least one non-transitory computer readable memory.

25. The tool of claim 24, wherein the mobile device comprises at least one of the following: a game device, a smart phone, a tablet, a camera, a robot, an augmented reality viewer, and a watch.

26. The tool of claim 1, wherein the at least one inter-connectable object primitive for the at least one marker in the marker set comprises a programming module or a line of code.

27. The tool of claim 1, wherein the content set is caused to be presented on the display based on an arrangement of the marker set in the physical environment.

28. At least one non-transitory computer readable medium storing software instructions executable by at least one processor to perform operations comprising:
   receiving a digital representation of a marker set comprising a plurality of markers in a physical environment;
   identifying at least one marker's identity in the marker set;
   identifying at least one inter-connectable object primitive for the at least one marker in the marker set from the at least one marker's identity;
   applying a content creation rule from available rules based on a device context;
   obtaining a set of content primitives comprising the at least one inter-connectable object primitive for the at least one marker in the marker set, each object primitive including a primitive interface;
   generating a content set by positionally coupling at least two primitives in the set of content primitives via their primitive interfaces according to the content creation rule and a physical environment of the at least one marker corresponding to the at least two primitives; and
   causing a device to present the content set on a display.

29. A computer-based method using at least one processor and at least one non-transitory computer readable medium storing software instructions comprising:
   receiving a digital representation of a marker set comprising a plurality of markers in a physical environment;
   identifying at least one marker's identity in the marker set;
   identifying at least one inter-connectable object primitive for the at least one marker in the marker set from the at least one marker's identity;
   applying a content creation rule from available rules based on a device context;
   obtaining a set of content primitives comprising the at least one inter-connectable object primitive for the at least one marker in the marker set, each object primitive including a primitive interface;
   generating a content set by positionally coupling at least two primitives in the set of content primitives via their primitive interfaces according to the content creation rule and a physical environment of the at least one marker corresponding to the at least two primitives; and
   causing a device to present the content set on a display.

* * * * *